United States Patent Office.

FRIEDRICH BAYER, OF ELBERFELD, GERMANY, ASSIGNOR TO THE FARBEN-FABRIKEN, VORMALS FRIEDR. BAYER & CIE., OF SAME PLACE.

MANUFACTURE OF DYE-STUFFS AND COLORING-MATTER.

SPECIFICATION forming part of Letters Patent No. 363,502, dated May 24, 1887.

Application filed January 17, 1887. Serial No. 224,600. (No specimens.)

*To all whom it may concern:*

Be it known that I, FRIEDRICH BAYER, a subject of the King of Prussia, residing at Elberfeld, in the Empire of Germany, director of and assignor to the FARBENFABRIKEN, VORMALS FRIEDR. BAYER & CIE., have invented a new and useful Improvement in the Manufacture of Dye Stuffs or Coloring-Matters, of which the following is a specification.

My invention relates to the production of a new bluish-red coloring-matter for dyeing cotton, wool, and silk by the action of the tetrazo compound of tolidine on a new sulphonic acid of the beta-naphthylamine, which I have called "betanaphthylamine deltamonosulphonic acid."

In carrying out my process to produce the new coloring-matter practically I proceed as follows: Fifty kilos of tolidine are converted in the well-known manner into the muriatic tetrazo compound. A solution of the same in one thousand liters of water is poured into a solution containing seventy-three kilos betanaphthylamine-deltamonosulphonic acid and one hundred and fifty kilos of acetate of soda. If the mixture is now stirred for a longer period or heated, an azo color is formed which is soluble in alkalies, and which dyes shades more bluish than the product gained from tolidine and all other well-known sulpho acids of beta-naphthylamine, and in particular the products of the betanaphthylamine-beta-monosulphonic acid.

The dye-stuff thus obtained forms a brown-red powder which is easily soluble in water, and dyes cotton, in a boiling alkaline or soap bath, a splendid bluish-red color, which will not be altered by acetic acid. On adding muriatic acid to the aqueous solution the free acid of the dye-stuff will be formed, having the following composition:

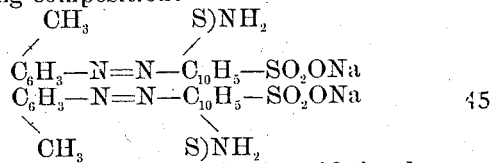

With concentrated sulphuric acid the dye-stuff described dissolves into a full blue color.

I do not in this application claim the process described, having made a separate application therefor, which I have filed March 18, 1887, No. 224,599.

What I claim as my invention, and desire to secure by Letters Patent, is—

The bluish-red coloring-matter herein described, which has the following characteristics: It exists as a brownish-red powder easily soluble in water; dyes cotton a splendid bluish-red in a boiling alkaline or soap bath, which color will not be altered by acetic acid; by adding muriatic acid to the aqueous solution the free acid of the dye-stuff is formed; with concentrated sulphuric acid the dye-stuff described dissolves into a full blue color.

In testimony whereof I have signed my name to this specification in the presence of two subscribing witnesses.

FRIED. BAYER.

Witnesses:
 WM. A. POLLOCK,
 GEO. T. CURTIS, Jr.